United States Patent
Robins et al.

(10) Patent No.: US 7,120,273 B2
(45) Date of Patent: Oct. 10, 2006

(54) APPARATUS AND METHOD FOR IMAGE GROUP INTEGRITY PROTECTION

(75) Inventors: Mark Nelson Robins, Greeley, CO (US); Heather Noel Bean, Ft. Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 638 days.

(21) Appl. No.: 10/159,467

(22) Filed: May 31, 2002

(65) Prior Publication Data

US 2003/0223614 A1    Dec. 4, 2003

(51) Int. Cl.
*G06K 9/00* (2006.01)
(52) U.S. Cl. .................................................. 382/100
(58) Field of Classification Search ................ 380/210, 380/252, 282, 51, 54, 201; 382/100, 232; 713/176; 370/522–529; 348/460, 463; 386/94; 725/20, 22; 283/902; 399/366; 705/57, 705/58
See application file for complete search history.

(56) References Cited

U.S. PATENT DOCUMENTS

| | | | | |
|---|---|---|---|---|
| 5,664,018 A | * | 9/1997 | Leighton | 380/54 |
| 5,684,799 A | * | 11/1997 | Bigham et al. | 370/397 |
| 5,877,445 A | * | 3/1999 | Hufford et al. | 84/602 |
| 5,943,093 A | * | 8/1999 | Anderson et al. | 348/231.6 |
| 6,353,672 B1 | * | 3/2002 | Rhoads | 382/100 |
| 6,664,976 B1 | * | 12/2003 | Lofgren et al. | 345/634 |
| 6,807,634 B1 | * | 10/2004 | Braudaway et al. | 713/176 |

* cited by examiner

*Primary Examiner*—Brian Werner
*Assistant Examiner*—Christopher Lavin

(57) ABSTRACT

A system and method for protecting the integrity of a group of images is provided. One embodiment for protecting the integrity of a group of images comprises watermarking each one of a plurality of images in an image group with a unique watermark having at least an image digest, the image digest comprising information that identifies the watermarked image as an original image, and the plurality of images having a predefined order in the image group; and including in selected ones of the unique watermarks a unique decryption key, each one of the unique decryption keys configured for decrypting the unique watermark of a next image in the image group.

22 Claims, 10 Drawing Sheets

APPARATUS AND METHOD FOR IMAGE GROUP INTEGRITY PROTECTION

TECHNICAL FIELD

The present invention is generally related to imagery authentication and, more particularly, is related to a system and method for protecting the integrity of an image group comprised of a plurality of images.

BACKGROUND OF THE INVENTION

In digitally based image capturing devices an image or "photograph" of an object is stored in a digital data format in the memory within, or coupled to, the image capturing device. A nonlimiting example of a image capturing device is the digital camera that captures still images and/or video images. Captured images are stored in a memory that resides within or is coupled to the digital camera.

Watermarking and other tampering detection techniques are known in the art for protecting the integrity of individual images. The watermarking and tamper detection techniques allow confirmation that the image has not been altered or otherwise tampered with.

However, groupings of images can be altered or otherwise tampered with. Potential alteration of a group of images includes the removal of one or more images from the group, the addition of one or more images to the group, and/or the replacement of one or more images of the group.

For example, a group of images may be captured by the police at a crime scene. During the investigation and/or trial, it would be very undesirable if one or more of the original images were "lost" from the group, if one or more images not from the original group of images were added to the group, or if one or more original images were replaced. If any such occurrence were to occur to the group of images, individual image watermarking might fail to detect added, missing or replaced images.

Another nonlimiting example includes electronic archiving of documents. For example, images of public records such as property assignment documents filed at a public office may be digitally copied and stored electronically. Thus, a group of images could establish a chain of title for the property. During a title search, it would be very undesirable if one or more of the images were "lost" from the group, if one or more images not from the group of images were added to the group, or if one or more images were altered. If any such occurrence were to occur to the group of original images, individual image watermarking techniques might fail to detect added, missing or replaced images.

SUMMARY OF THE INVENTION

The present invention provides a system and method for protecting the integrity of a plurality of images. Briefly described, in architecture, one embodiment for protecting the integrity of a group of images comprises watermarking each one of a plurality of images in an image group with a unique watermark having at least an image digest, the image digest comprising information that identifies the watermarked image as an original image, and the plurality of images having a predefined order in the image group; and including in selected ones of the unique watermarks a unique decryption key, each one of the unique decryption keys configured for decrypting the unique watermark of a next image in the image group.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
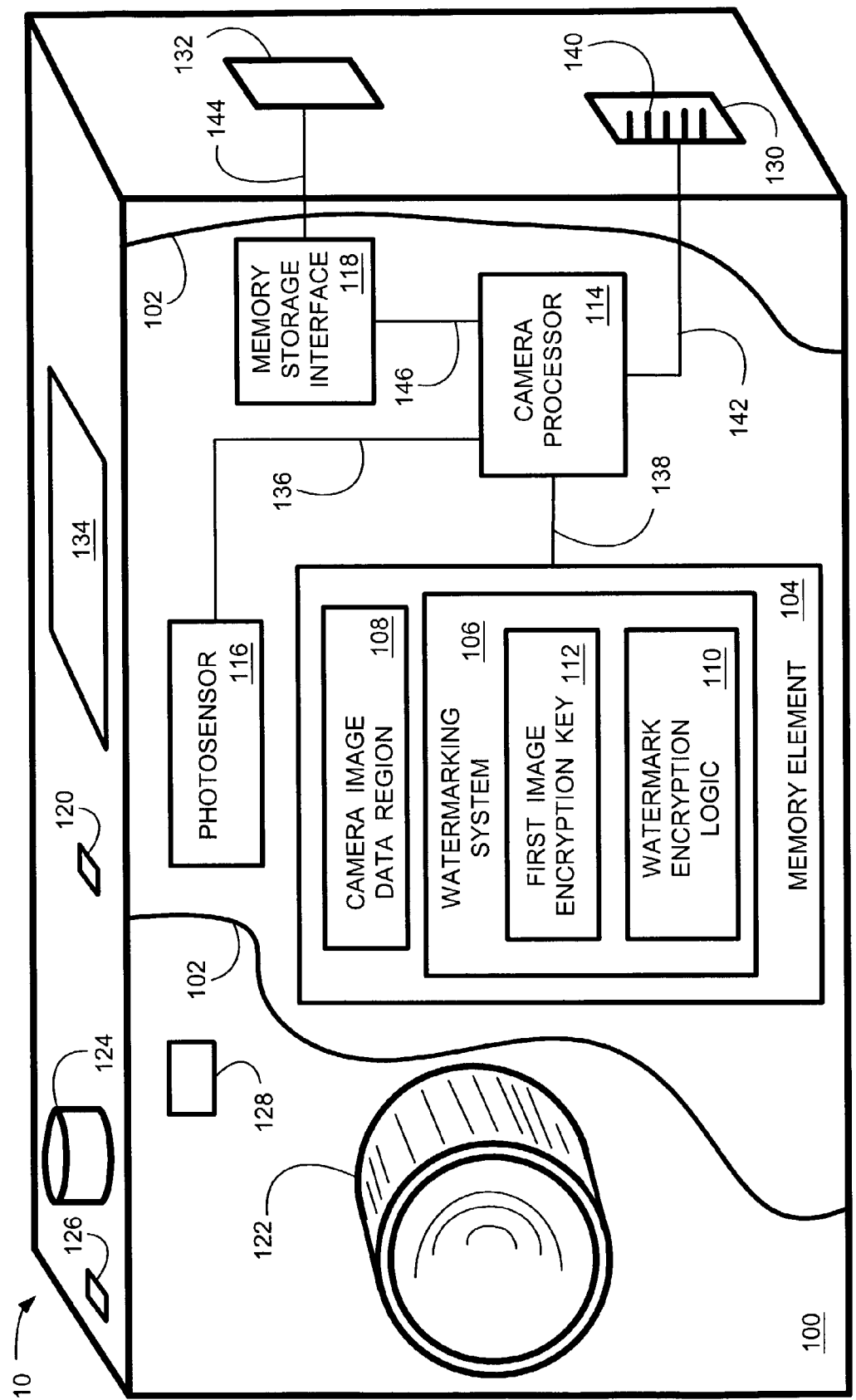
FIG. 1 is a block diagram of an embodiment of an image group watermarking system implemented in a digital camera.

The present invention, an image group watermarking system, provides a system and method for protecting the integrity of a plurality of images that are grouped together into an image group. Integrity of the image group is effected by watermarking each image in the image group in accordance with the present invention.

For convenience, an "image" is defined herein to include any of the various forms of digital information corresponding to an image that is captured by a image capture device, such as, but not limited to, digital cameras, facsimile (FAX) machines, copy machines, or the like. When a watermark is incorporated onto the image by the image group watermarking system in accordance with the present invention, the digital information corresponding to the captured image and its watermark is referred to hereinafter as a "watermarked image." When a group of captured images are defined, the group of images are referred to hereinafter as an "image group." When a group of captured images are defined and watermarked by an embodiment of the image group watermarking system, the group of watermarked images are referred to hereinafter as a "watermarked image group."

As used herein, the term "watermark" includes information that is encrypted (embedded) into the pixel data of a selected plurality of pixels that comprise a digital image. As described in greater detail below, such information includes the image digest. The image digest is used to determine if image tampering has occurred. In addition to the image digest information, the watermark may optionally include other information. Furthermore, the term watermark as used herein further includes information that is incorporated into other parts of the image data, such as, but not limited to, the header.

In one embodiment, watermarking is done by selecting a plurality of pixels such that the data associated with the selected plurality of pixels is altered to include the information associated with a watermark. Pixel data in a watermarked image in accordance with the present invention may be altered such that a "watermark image" is visible to a viewer of the image. Alternatively, altered pixel data in a watermarked image in accordance with the present invention may not be visibly discernible from unaltered pixel data to a viewer of the image. Such watermark information would be detectable electronically.

Furthermore, for convenience, the term "watermark" is intended herein to include data that is incorporated into other portions of the image data associated with an image. Such data may also be referred to herein as encryption data or encrypted data.

For convenience, an image, a watermarked image, an image group and/or a watermarked image group, are collectively and/or interchangeably referred to as "image data" when referencing to the digital data that corresponds to the image. Depending upon the medium in which the image data is stored, processed and/or communicated, the format of the image data may vary. For example, the format of the image data may vary if the image data is communicated over a hardwire connection, an infrared medium, or a wireless radio frequency medium. Furthermore, image data may be, in some instances, communicated in an analog data format, such as, but not limited to, instances where the image data is communicated over a hardwire connection.

For convenience of teaching the components, operation and functionality of the various embodiments of an image group watermarking system, one embodiment of the image group watermarking system is described as being implemented in, or being a part of, a digital camera 100 (FIG. 1). The image group watermarking system is equally applicable in any image capture device configured to capture images and generate watermarked images. For example, but not limited to, a fax machine, a camera film processor, a copy machine, or other device having an image detector, are alternative embodiments of an image group watermarking system. Thus, copied and/or communicated images may be captured and watermarked in accordance with an embodiment of an image group watermarking system.

Another embodiment of an image group watermarking system includes an image detector residing on or within a personal computer to facilitate video conferencing or to supplement e-mail with picture or video information. Accordingly, selected frames from a video are watermarked by an embodiment of an image group watermarking system in accordance with the present invention, thereby generating a plurality of watermarked images forming a watermarked image group.

Figure 2:
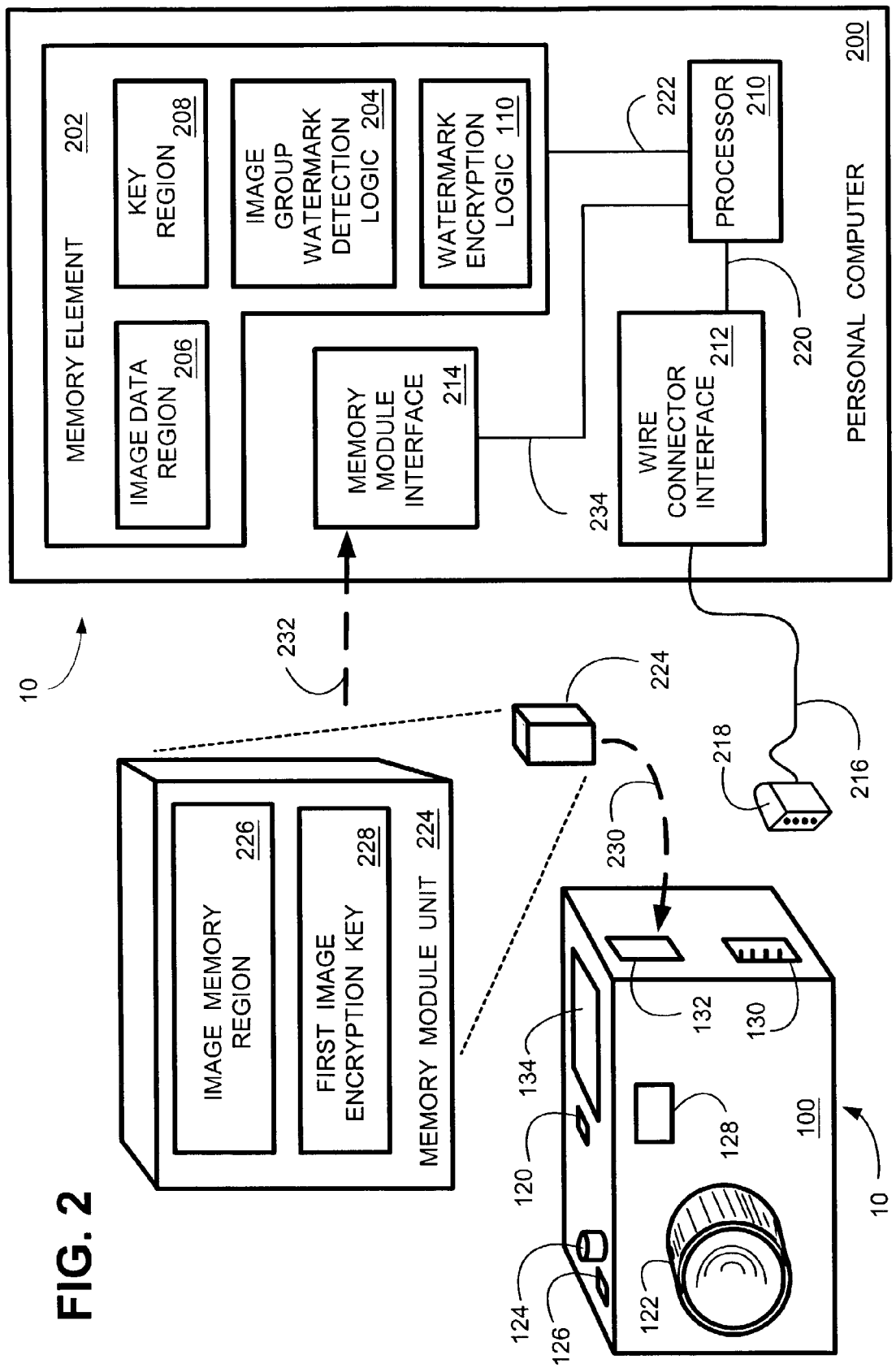
FIG. 2 is a block diagram of an embodiment of image group watermarking system implemented in a digital camera, and another embodiment of image group watermarking system implemented in personal computer.

Another embodiment of an image group watermarking system is implemented in a processing device configured to receive a plurality of images and/or at least one image group. That is, this embodiment does not include an image capture device. Rather than capturing the images, this embodiment of an image group watermarking system implemented in a processing device receives a plurality of previously captured images and/or at least one image group, and adds a watermark to each of the images in accordance with the present invention. For convenience of teaching the components, operation and functionality of the image group watermarking system, this embodiment is described as being implemented in, or being a part of, a personal computer 200 (FIG. 2). This embodiment is equally applicable to any processing device configured to receive a plurality of images and/or at least one image group, and further configured to generate a plurality of watermarked images and/or at least one watermarked image group. For example, but not limited to, a mainframe processor, or an image processor, or a specially fabricated peripheral device are alternative embodiments of an image group watermarking system.

Another embodiment of the image group watermarking system, described in greater detail below, is implemented in a processing device configured to analyze at least one watermarked image group. The watermarked images corresponding to watermarked image group in accordance with the present invention, are analyzed by an embodiment of an image group watermarking system, as described in greater detail below. For convenience of teaching the components, operation and functionality of this embodiment of the image group watermarking system, this embodiment is described as being implemented in, or being a part of, a personal computer 200 (FIG. 2). Furthermore, but not limited to, a mainframe processor, or an image processor, or a specially fabricated peripheral device are alternative embodiments.

FIG. 1 is a block diagram of an embodiment of an image group watermarking system 10 implemented in a digital camera 100. FIG. 1 illustrates selected external and internal components, separated by cut-away lines 102. Internal components of the digital camera 100 are illustrated between the two cut-away lines 102. Internal components include at least a memory element 104 storing the watermarking system 106 and a camera image data region 108. The watermarking system 106 includes at least a watermark encryption logic 110 and a first image encryption key 112. Other internal components include a camera processor 114 and a photosensor 116. In one embodiment of digital camera 100 employing a memory module unit 224 (FIG. 2), described in greater detail below, digital camera 100 may include a memory storage interface 118.

Cut-away lines 102 demark components residing on the outside surfaces of the digital camera 100 and components residing internally in the digital camera 100. Thus, control button 120, lens unit 122, image capture actuation button 124, power switch 126, viewing lens 128, plug-in interface 130, memory unit interface 132 and display 134 are recognized as components residing on the surfaces of digital camera 100.

As described in greater detail herein, control button 120 is actuated to cause the digital camera 100 to operate in an image group watermarking mode of operation. Thus, when not operating in an image group watermarking operating mode, images are captured without watermarking as described herein in accordance with the present invention. When control button 120 is actuated, captured images are defined into an image group and watermarked as described herein. Thus, the activation of an image group watermarking system 10 while the digital camera 100 is operating is optional. The image group watermarking system 10 is activated when a user selects the image group watermarking mode of operating the digital camera 100 by actuating control button 120. In other embodiments, control button 120 may be a specially dedicated controller device, such as a control button, a push-button, a switch or the like. In another embodiment, the functionality of control button 120 is incorporated into another multi-function controller. In yet another embodiment, the image group watermarking mode of operating is effected via a menu system shown on display 134.

Photosensor 116 is disposed in a suitable position behind the lens unit 122 such that an image (not shown) is focused onto the photosensor 116 for capturing. Photosensor 116 provides information corresponding to the detected image to the camera processor 114, via connection 136.

Display 134 is used for previewing images prior to capturing, for viewing captured images, and/or for viewing information for controlling the operation of the digital camera. For convenience of illustration, the display 134 is illustrated as residing on the top of the digital camera 100. When the digital camera 100 is operating in a mode that displays the image currently detected by photosensor 116 on display 134, the displayed image is hereinafter referred to as a preview image.

The user of the digital camera 100 can preview a detected current image to determine if the user wants to "photograph"

the detected current image. If so, the user of the digital camera 100 actuates the image capture actuation button 124 such that camera processor 114 transfers the received image information from the photosensor 116 into the camera image data region 108 of memory element 104. That is, when the user actuates image capture actuation button 124, camera processor 114 reformats the current image detected by photosensor 116 into a image that is suitable for storage into memory element 104, via connection 138. As the user of digital camera 100 continues with the process of "photographing" images, a plurality of images corresponding to a plurality of captured images is stored into the camera image data region 108 of memory element 104.

Once a plurality of images have been captured and stored into memory, the user of digital camera 100 may selectively recall captured images from memory for viewing. When the digital camera 100 is operating in a mode that displays previously captured images on display 134, the displayed image is hereinafter referred to as a review image.

In one embodiment, plug-in interface unit 130 includes a plurality of connection pins 140 to facilitate mating of plug-in attachment 218 (FIG. 2) and plug-in interface unit 130, and to provide connectivity between connection 216 and digital camera 100. Other embodiments employ other suitable connectors.

FIG. 2 is a block diagram of an embodiment of image group watermarking system 10 implemented in a digital camera 100, and another embodiment of image group watermarking system 10 implemented in personal computer 200. Personal computer 200 includes at least memory element 202 storing image group watermark detection logic 204, image data region 206 and key region 208. Also included is at least processor 210, wire connector interface 212 and memory module interface 214.

Personal computer 200 receives a watermarked image group from digital camera 100 in accordance with the present invention. In one embodiment of the image group watermarking system 10, the received watermarked image group is stored in image data region 206. Encryption keys according to the present invention, and described in greater detail below, are stored in key region 208. Alternatively, other embodiments of the image group watermarking system 10 store the encryption key in another suitable location within memory element 202, or in another suitable memory device.

In one mode of operation, digital camera 100 transfers the watermarked image group to personal computer 200 via connection 216. For convenience, connection 216 is illustrated as a hardwire connection coupled to the plug-in attachment 218. Connection 216 may be any suitable connection device employing a communication medium suitable for communicating data, such as, but not limited to a universal serial bus (USB), serial connection, parallel connection, wireless radio frequency, and wireless infrared. The plug-in attachment 218 is configured to mate with the plug-in interface unit 130 (FIG. 1). The user of the personal computer 200 and the digital camera 100 mates the plug-in attachment 218 to the plug-in interface unit 130 thereby establishing connectivity between the digital camera 100 and the personal computer 200. The user then instructs the personal computer 200 and/or digital camera 100 to execute logic such that at least one watermarked image group is transferred from the digital camera 100, via connection 142, through plug-in interface 130, connection 216 and wire connector interface 212. Once personal computer 200 receives the watermarked image group, the watermarked image group is transferred to processor 210, via connection 220, and then into the image data region 206 of memory element 202, via connection 222.

In another embodiment of an image group watermarking system 10, digital camera 100 stores image data (one or more images and/or at least one watermarked image group) in memory module unit 224. Memory module unit 224 includes at least an image memory region 226 for storing the image data, and a first image encryption key 228 in accordance with the present invention. Memory module unit 224 is coupled to the digital camera 100 through the memory unit interface 132, as illustrated by the path of insertion represented by dashed line 230. Accordingly, when the user actuates the image capture actuation button 124 such that camera processor 114 transfers the detected image from the photosensor 116 to the camera processor 114, the image data is communicated into the image memory region 226. In one embodiment, a image data is communicated from camera processor 114 to memory storage interface 118, via connection 146, such that the image data is formatted into a data format that is compatible with memory module unit 224. In another embodiment, camera processor 114 provides suitably formatted image data directly to the memory module unit 224, via connections 144 and 146. Accordingly, such an embodiment does not employ memory storage interface 118.

Memory module unit 224 may be formatted in various ways, such as, but not limited to, a standard computer disk, a floppy disc, a compact disk (CD), a mini-compact disk, or other suitable memory medium. Image data is transferred to the personal computer 200 by removing the memory module unit 224 from the digital camera 100 and coupling the memory module unit 224 to personal computer 200 by inserting memory module unit 224 into the memory module interface 214, as illustrated by the path of insertion represented by dashed line 232. In one embodiment, a convenient coupling port or interface (not shown) is provided on the surface of personal computer 200 such that the memory module unit 224 is directly coupled to the personal computer 200. Once the memory module unit 224 is connectively coupled to the memory module interface 214, image data is transferred to the processor 210, via connection 234, and to the image data region 206 of memory element 202, via connection 222.

For convenience, digital camera 100 is illustrated as employing both a plug-in interface 130 configured to connectively couple to a physical connector 216 and a memory unit interface 132 configured to receive memory module unit 224. Other embodiments of digital camera 100 employ either plug-in interface 130 or a memory unit interface 132 to facilitate the transfer of image data to personal computer 200.

For convenience, personal computer 200 and digital camera 100 are illustrated as having only selected components of interest. However, personal computer 200 and digital camera 100 include additional internal components not illustrated in FIGS. 1 and 2.

Figure 3:
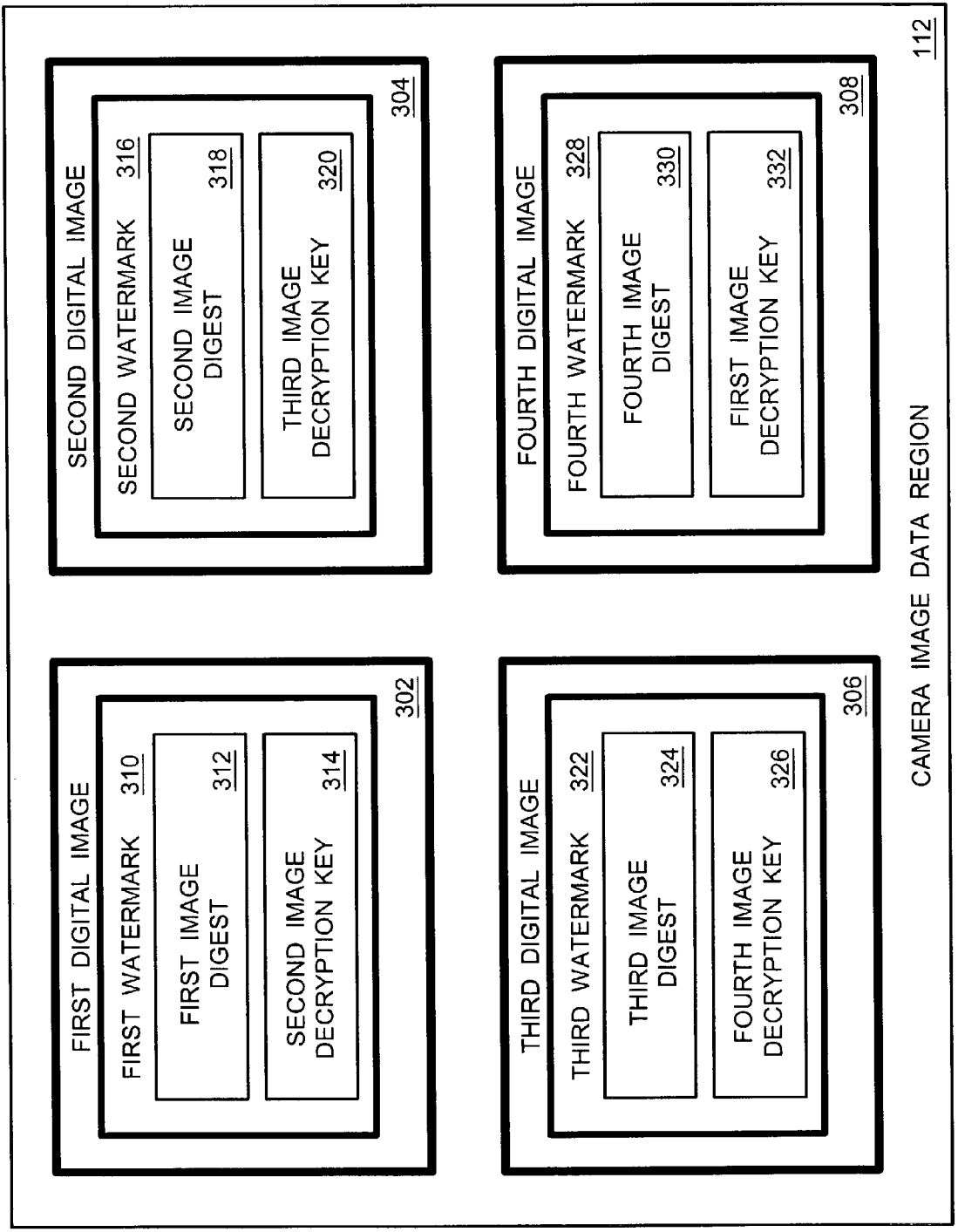
FIG. 3 illustrates four images having watermarks in accordance with an embodiment of the present invention.
Figure 4A:
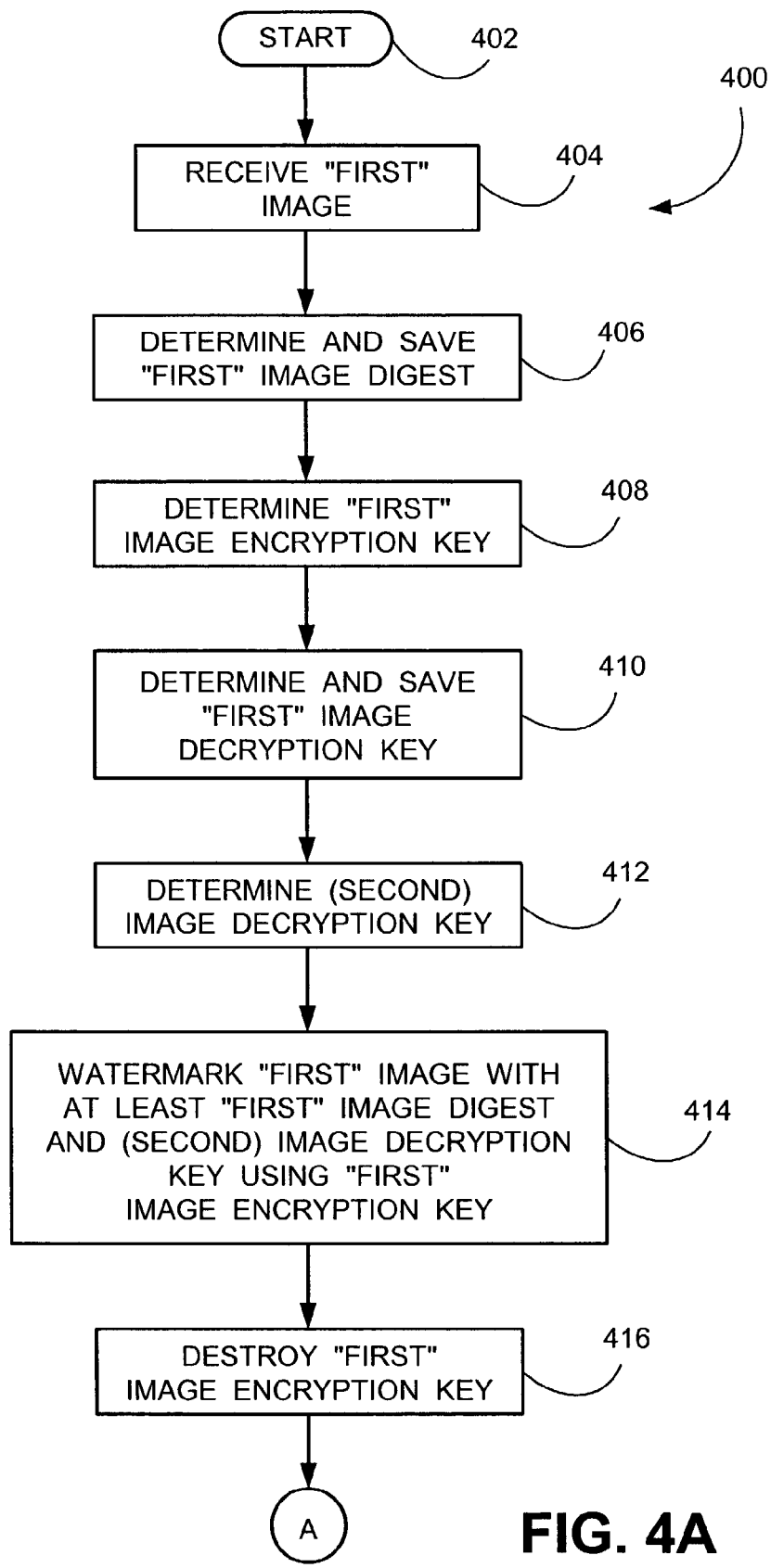
FIGS. 4A–D is a flowchart illustrating a process used by an embodiment of the image group watermarking system.
Figure 4B:
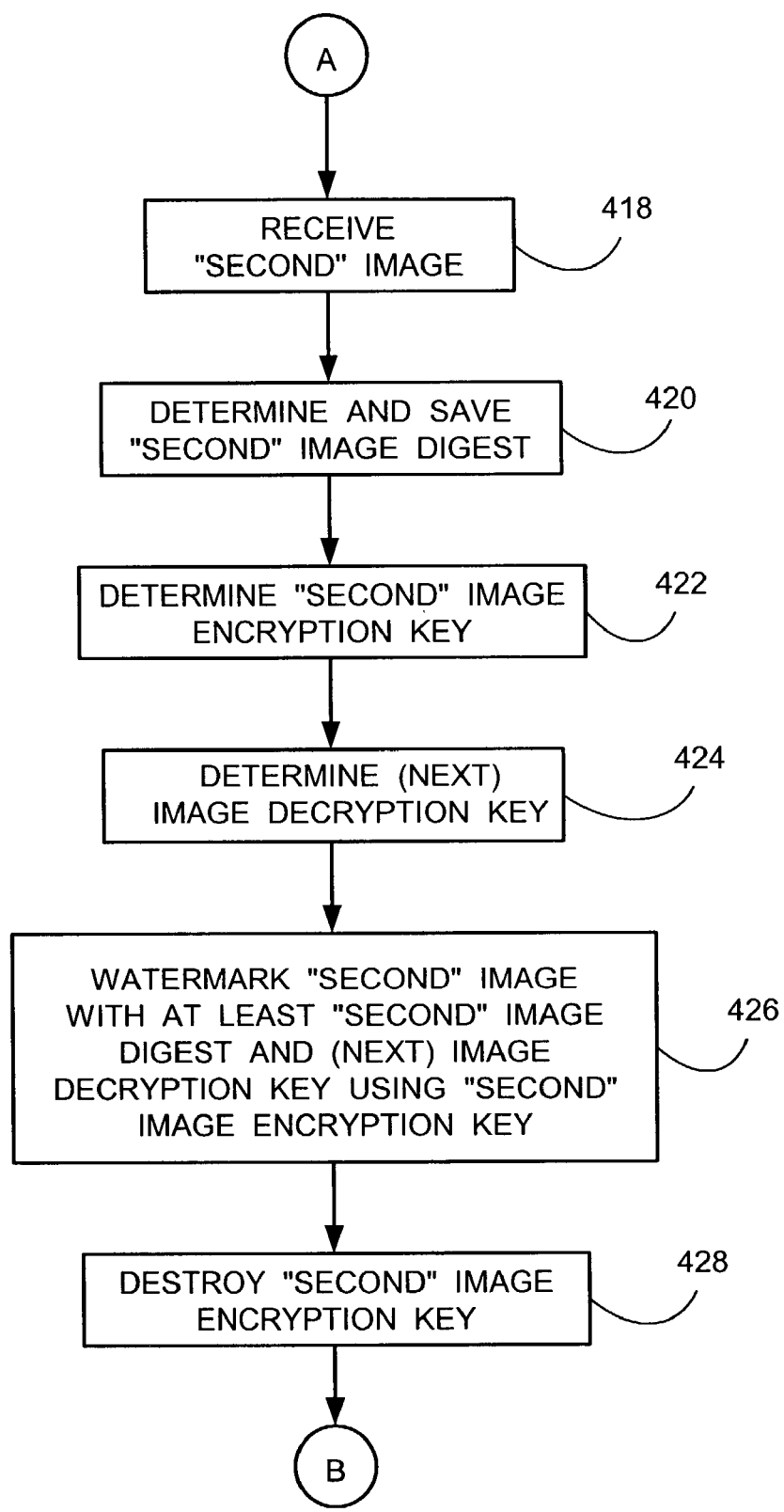
Figure 4C:
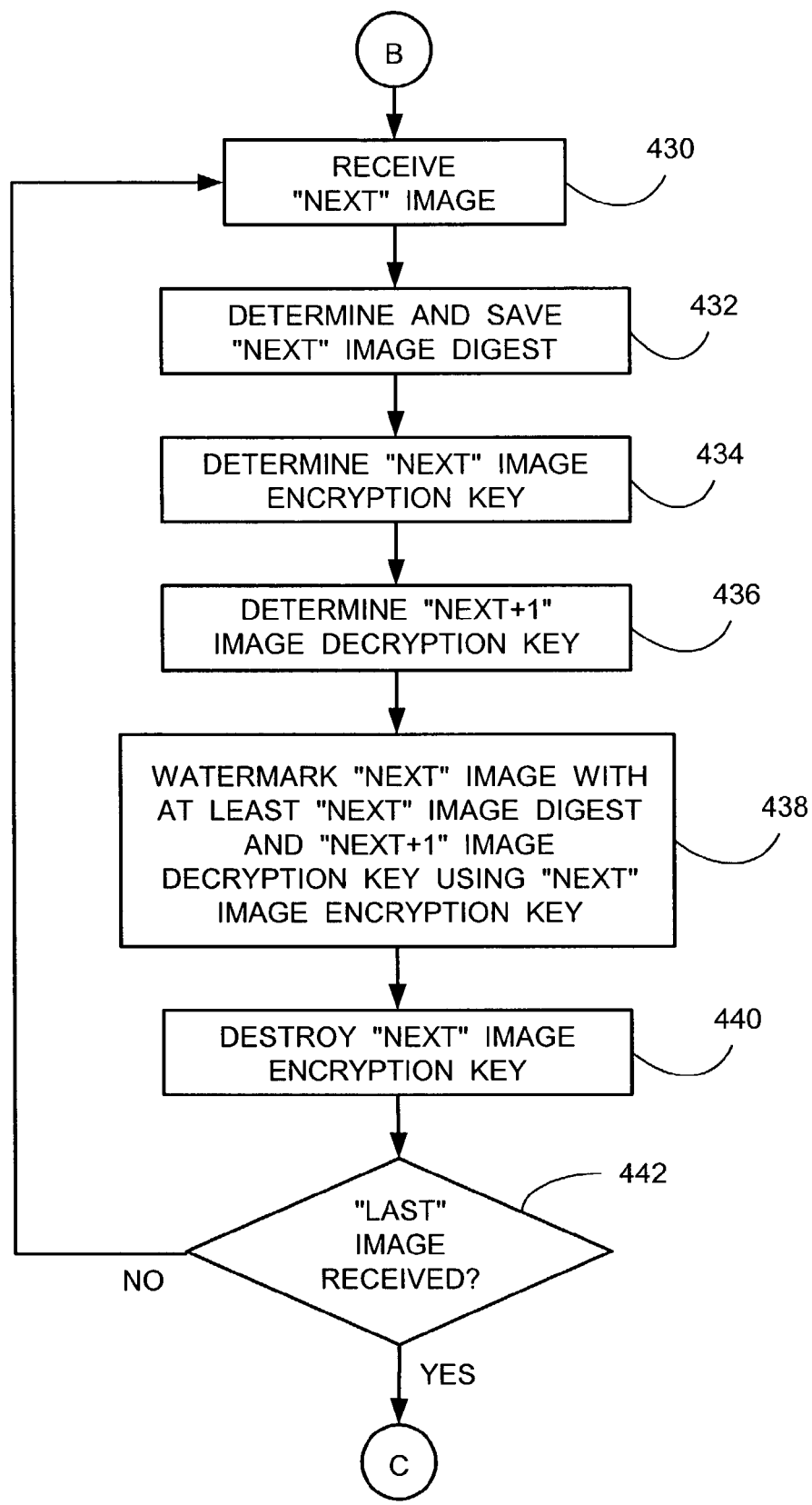
Figure 4D:
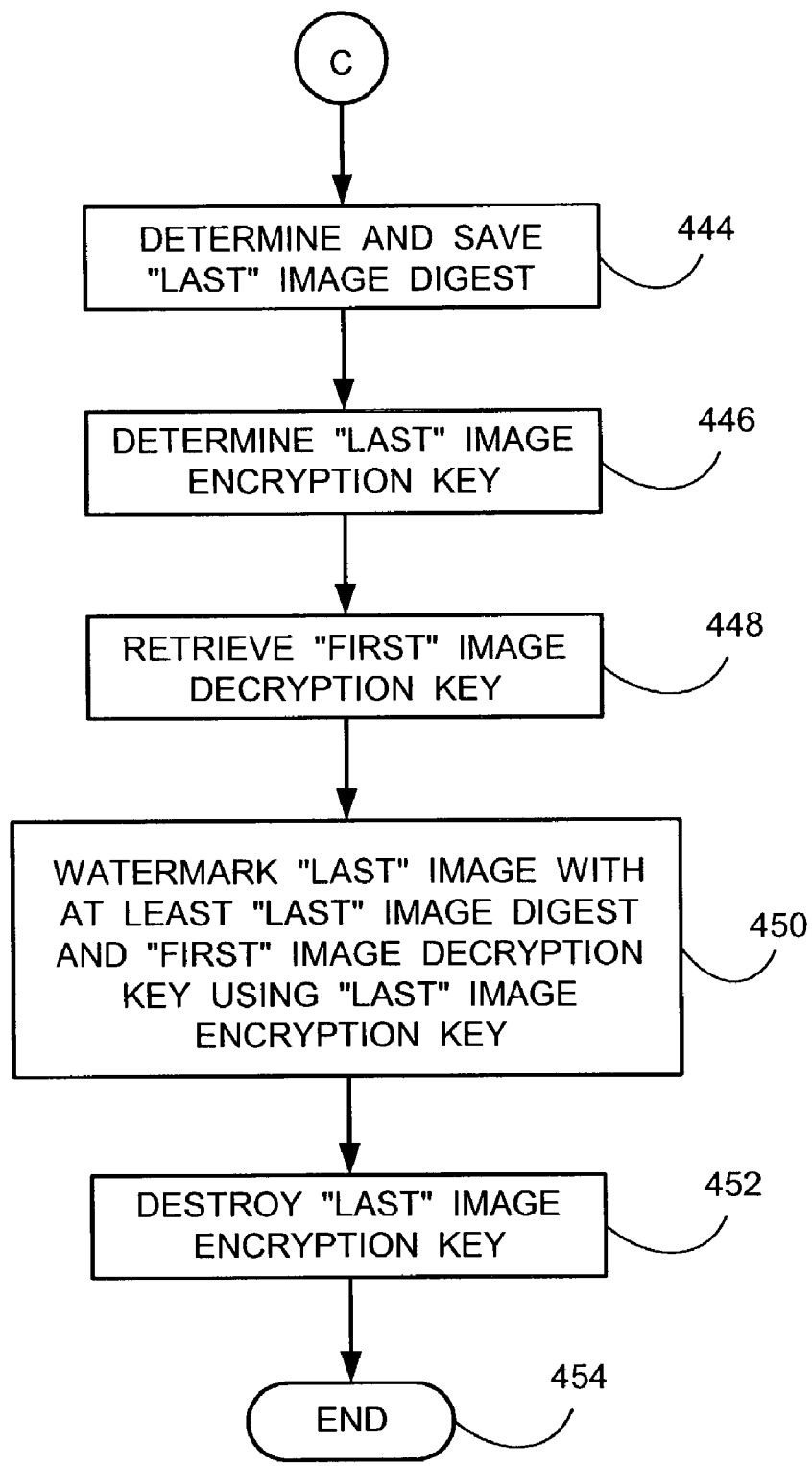

FIG. 3 illustrates four watermarked images 302, 304, 306 and 308 having watermarks in accordance with an embodiment of the image group watermarking system 10. Each watermark includes at least an image digest for the watermarked image and a decryption key for the next watermarked image in the watermarked image group.

The image digest is used for determining if at least one of the watermarked images in a watermarked image group has been removed, replaced, forged, tampered with, altered, or otherwise corrupted. Thus, security of each individual watermarked image in the watermarked image group is provided.

As described in greater detail below, the image decryption key is used for decrypting at least the watermark of the next watermarked image in the watermarked image group. When the watermark of the next watermarked image is read or otherwise inspected, the decryption key necessary to decrypt the watermark must be obtained from the prior watermarked image. In one embodiment, this decryption key exists only in the watermark of the previous watermarked image. No other record or occurrence of the decryption key exists. Thus, if one of the watermarked images in the watermarked image group, watermarked in accordance with the present invention, is removed, replaced, forged, tampered with, altered, or otherwise corrupted, the watermark for the next watermarked image cannot be determined. Accordingly, a person will understand that the prior watermarked image has been removed, replaced, forged, tampered with, altered, or otherwise corrupted.

For convenience, the four watermarked images 302, 304, 306 and 308 are used to describe the components, operation and functionality of embodiments of a image group watermarking system 10. The image group watermarking system 10 is equally applicable with watermarked image groups having two, three, five, or any other number of watermarked images.

In FIG. 3, an embodiment of the image group watermarking system 10 has watermarked the four images 302, 304, 306 and 308. Accordingly, the first watermarked image 302 includes at least a first watermark 310 having at least a first image digest 312 and a second image decryption key 314. The second image decryption key 314 is necessary to decrypt at least the second water mark 316 of the second watermarked image 304. In an alternative embodiment, the second image decryption key 314 is necessary to decrypt both the second water mark 316 and the second watermarked image 304.

Similarly, the second watermarked image 304 includes at least a second watermark 316 having at least a second image digest 318 and a third image decryption key 320. The third image decryption key 320 is necessary to decrypt at least the third water mark 322 of the third watermarked image 306. In an alternative embodiment, the third image decryption key 320 is necessary to decrypt both the third water mark 322 and the third watermarked image 306.

The third watermarked image 306 includes at least a third watermark 322 having at least a third image digest 324 and a fourth image decryption key 326. The fourth image decryption key 326 is necessary to decrypt at least the fourth water mark 328 of the fourth watermarked image 308. In an alternative embodiment, the fourth image decryption key 326 is necessary to decrypt both the fourth water mark 328 and the fourth watermarked image 308.

The fourth watermarked image 308 includes at least a fourth watermark 328 having at least a fourth image digest 330 and a first image decryption key 332. The first image decryption key 332 is necessary to decrypt at least the first water mark 310 of the first watermarked image 302. In an alternative embodiment, the first image decryption key 332 is necessary to decrypt both the first water mark 310 and the first watermarked image 302.

Accordingly, and as illustrated by the four watermarked images 302, 304, 306 and 308, decryption key for the next watermarked image are coded into each watermark. Thus, if one of the watermarked images are removed, altered or replaced with a forgery, the watermark of the next watermarked image can not be decrypted because the necessary decryption key is not available. In an embodiment that required the decryption key for decrypting both the image and the watermark, the next image cannot be analyzed at all since the image cannot be decrypted. One embodiment, upon determining that one of the watermarked images or its associated watermark cannot be decrypted, generates a corruption message. For example, but not limited to, the corruption message in one embodiment identifies the watermarked image that is missing, specifies the watermarked image that is tampered with, specifies the watermarked image that is altered, or specifies the watermarked image that has been replaced with a forgery.

Digital camera 100, in one embodiment, is configured to capture a plurality of images and store a corresponding plurality of images in the camera image data region 108 (FIG. 1). When the user of the digital camera 100 is ready to create a watermarked image group in accordance with the present invention, the user selects the images that are to comprise the watermarked images in the watermarked image group. The user selects images for watermarking (and their order in the image group) by actuation of control button 120. Once the image group has been defined, actuation of control button 120, or another suitable controller, causes the images to be watermarked in accordance with the present invention. As noted above, the functionality of control button 120 may be implemented in a variety of suitable controller devices.

In one embodiment, the user specifies the order of the selected images that will be used to create the watermarked image group. That is, the user specifies a image group. Thus, the user associates a number, letter, tag or other suitable identifier with each selected image. In another embodiment, images are ordered according to the order that the user selects the images. In another embodiment, images are ordered according to the order that the user captures the images. In yet another embodiment, images are ordered according to the time that the images were captured. As described above, the images are not yet watermarked in accordance by an embodiment of an image group watermarking system 10. Accordingly, one embodiment allows the user to alter, add, delete or reorder the images in the specified image group. For example, the user may wish to add a date/time stamp, or other suitable meta-data, to the image before the image is watermarked in accordance with the present invention. Preferably, the above-described control button 120 is configured such that actuation of control button 120 allows the user of digital camera 100 to specify images that are to be watermarked by the watermark encryption logic 110.

An alternative embodiment of the image group watermarking system 10 implemented in digital camera 100 watermarks images as the images are captured. When control button 120 is actuated, digital camera 100 is caused to operate in an image group watermarking mode of operation. Thus, subsequently captured images are known to be images that are to be watermarked by the watermark encryption logic 110. Accordingly, as the next image is captured, the captured image is immediately watermarked by the watermark encryption logic 110. As described herein, a decryption key for the next captured image is determined at the time the current image is captured such that the determined decryption key (for the next captured image) is encrypted into the current captured image as it is watermarked. Control button 120 is later actuated to indicate that the next image captured is to be the last captured image of the watermarked image group. Thus, the next captured image is watermarked in accordance with the present invention. The digital camera 100 then returns to its previous mode of operation (or another predefined mode of operation).

Another embodiment of the image group watermarking system 10 implemented in personal computer 200 includes an embodiment of the watermark encryption logic 110. Such an embodiment of the watermark encryption logic 110 is configured to receive a plurality of previously captured images residing in image data region 206 of memory element 202, camera image data region 108 of memory element 104, image memory region 226 of memory module unit 224, or another remote memory configured to store captured images. Such an embodiment is particularly suited for generating a watermarked image group from previously captured images and/or from images captured from a plurality of image capture devices.

For example, but not limited to, a crime scene may be investigated by a plurality of investigators each having their own image capture device. Captured images of the crime scene, captured by the plurality of image capture devices, may be later aggregated together and watermarked such that a watermarked image group is generated in accordance with the present invention. Furthermore, other documents or images of interest copied by other types of image capture devices (copy machines, FAX machines, etc.) that generate digital images are watermarked and included in a watermarked image group in accordance with the present invention. Thus, watermarked images associated with the investigated crime scene are compiled into a watermarked image group such that image tampering to any of the watermarked images in the watermarked image group is detectable.

The image digest is comprised of any suitable information identifying the originality of an image such that an image may be determined to be the original image. Meta data may also be included in the image digest. For example, but not limited to, the meta data may include the identity of the individual capturing the image, the identity and/or location of a sender and/and or an intended recipient of the image if the image group is communicated, the date and/or time when the image was captured or when the image group was communicated, or other information of interest.

Once the user has selected and/or ordered the images of the image group, the user prompts the above-described camera processor 114 (FIG. 1) or the above-described processor 210 (FIG. 2) to execute the watermark encryption logic 110. At least two functions are performed for each image such that a watermarked image is generated. Each image is analyzed such that an image digest, described in greater detail below, is created and associated with the image. An image decryption key is specified for the next image in the image group. At least this above-described information (image digest and next image decryption key) is included in the watermark for that image.

Accordingly, the watermark encryption logic 110 defines an encrypting key for a image, and then encrypts the watermark and insert it into the image, thus creating a watermarked image. After the watermark is encrypted, the encryption key is destroyed. Thus, even if the watermark of the watermarked image can be decrypted, it is not possible for a tampered-with or forged watermark to be re-encrypted and inserted into the image because the tampered-with or forged watermark must be decrypted using the decryption key from the previous watermarked image in the watermarked image group. Thus, tampering with the watermark or forging the watermark results in the chain of watermarked images being broken such that the tampering or forgery is detected.

As will be described in greater detail below, the image digest created from each image is used to determine if an image has been removed, replaced, altered, tampered with and/or forged. Any suitable analysis technique, generally known as hashing, is used in one embodiment to create the digest containing the defining characteristics of the image. Examples of hash functions include checksums, cyclic redundancy codes (CRCs), etc. Thus, if the image digest of a replacement, altered, tampered-with or forged image is compared with the image digest of the original image, the two image digests will be different. A difference in image digests indicates a replacement; altered, tampered-with or forged image.

Alternative embodiments of an image group watermarking system 10 employ other techniques in analyzing an image. For example, only the watermark itself, or a plurality of watermarks, or a pattern of watermarks may be analyzed. Or, another embodiment analyzes selected portions of the image. The image group watermarking system 10 is equally applicable to any form of image analysis that is used to define the characteristics of an original image and/or its watermark(s). Accordingly, the determined characteristics of a image and/or its watermark(s) are referred to herein as the image digest.

As described above, the watermark encryption logic 110 encrypts a watermark and inserts it in each one of the selected images of the image group to create watermarked images in a watermarked image group. Watermarks in accordance with the present invention are inserted into an image using any suitable watermarking process, method or technology. For example, at least one watermarking technique in accordance with the present invention inserts the watermark data into the least significant bits (LSB) of selected pixels. In another embodiment, the watermark data in accordance with the present invention are inserted into the image in the frequency domain.

FIGS. 4A–D is a flowchart 400 illustrating a process used by an embodiment of the image group watermarking system 10. Flowchart 400 shows the architecture, functionality, and operation of one implementation of a system for watermarking a plurality of images in an image group in accordance with the present invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 4A–D. For example, two blocks shown in succession in FIGS. 4A–D may in fact be executed substantially concurrently or the blocks may sometimes be executed in the reverse order, depending upon the functionality involved, as will be further clarified hereinbelow.

It is understood that prior to starting the process illustrated by flowchart 400, a plurality of images have been defined into an image group. Accordingly, with an embodiment of the image group watermarking system 10 implemented in digital camera 100, a plurality of images have been captured by the digital camera 100 and stored in memory. Similarly, with an embodiment of the image group watermarking system 10 implemented in personal computer 200, a plurality of images have been accessed from a memory. The plurality of images in the above-described embodiments have been predefined as an image group.

The process of watermarking a group of images in an image group by the image group watermarking system 10 starts at block 402. At block 404, a "first" image is received from a memory. Thus, an embodiment implemented in digital camera 100 retrieves the "first" image from the camera image data region 108 in memory element 104 or from the image memory region 226 of memory module unit 224. If implemented in personal computer 200, the image is retrieved from the image data region 206 in memory element 202 or from another suitable memory element that is accessible by personal computer 200.

At block 406, the image digest for the "first" image is determined and saved. At block 408, an image encryption key for the "first" image is determined. At block 410, a "first" image decryption key is determined and saved. At block 412, a "second" image decryption key is determined.

At block 414, the "first" image is watermarked with at least the "first" image digest and the "second" image decryption key encrypted using the "first" image encryption key. At block 416, the "first" image encryption key is destroyed. Thus, the "first" image is watermarked with information that will be used to verify the originality of the "first" image (the image digest), along with the "second" image decryption key that will be used to decrypt the "second" image watermark of the predefined image group. The decryption key for the "first" image watermark will be inserted into the last image watermark in one embodiment.

At block 418, a "second" image is received. At block 420, a "second" image digest,is determined and saved. At block 422, a "second" image encryption key is determined. At block 424, the "next" image decryption key is determined. Then, at block 426, the "second" image is watermarked with at least the "second" image digest and the "next" image decryption key encrypted using the second image encryption key. It is understood that at this stage of the process, the "next" image referred to above is the third image of the image group. At block 428, the "second" image encryption key is destroyed.

The process proceeds to block 430 where the "next" image is received. It is understood that at this stage of the process, the "next" image referred to above is the third image of the image group. However, as described in greater detail below, blocks 430 through 442 are configured to watermark the remaining images in the predefined image group. Thus, the "next" image is the image currently being watermarked. At block 432, the "next" image digest is determined and saved. At block 434, the "next" image encryption key is determined. At block 436, the "next+1" image decryption key is determined (where the phrase "next+1" identifies the image immediately following the image that is currently being watermarked).

At block 438, the "next" image is watermarked with at least the "next" image digest and the "next+1" image decryption key encrypted using the "next" image encryption key. At block 440, the "next" image encryption key is destroyed. At block 442, a determination is made whether the "last" image of the predefined image group has been received. If not (the NO condition), the process returns to block 430 such that the "next" image is received and then watermarked. That is, blocks 430 through 442 are repeated until all but the "last" image has been watermarked. The watermarking of the "last" image is described below.

If at block 442 the "last" image has been received, the process proceeds to block 444. At block 444, the "last" image digest is determined and saved. At block 446, the "last" image encryption key is determined. At block 448, the "first" decryption key, determined and saved at block 410, is retrieved. At block 450, the "last" image is watermarked with at least the "last" image digest and the "first" image decryption key encrypted using the "last" image encryption key. At block 452, the "last" image encryption key is destroyed. The process ends at block 454.

In an alternative embodiment, the "first" image decryption key is not encrypted into the "last" image since the "first" image decryption key is communicated along with (or separately from) the watermarked image group. Thus, the separately provided "first" image decryption key is used to decrypt the "first" image watermark, as described below.

However, in the above described embodiment wherein the "first" image decryption key is encrypted into the "last" image, the "first" image decryption key does not need to be separately communicated. Another image decryption key can be separately communicated, thereby improving security of the watermarked image group. For example, but not limited to, the "second" image decryption key could be separately communicated. Thus, an individual decrypting an image group watermarked according to the present invention would have to know that the received image decryption key is associated with the second watermarked image of the watermarked image group.

It is understood that in the above described process, the "destroying" of an image encryption key (blocks 416, 428, 440 and 452) means that the encryption key is deleted or otherwise removed from its current memory location and not saved in a memory. Thus, if an image watermarked in accordance with the present invention is removed, forged, tampered with, altered, or otherwise corrupted, a replacement image cannot be generated since the original encryption key cannot be determined. Furthermore, since a replacement image cannot be generated, the decryption key for the next watermarked image in an image group watermarked in accordance with the present invention is lost such that the watermark in the next watermarked image cannot be decrypted.

Once an image group is watermarked by an embodiment of an image group watermarking system 10, individual watermarked images in the watermarked image group cannot be removed, replaced, forged, tampered with, altered, or otherwise corrupted without detection during the decryption process. Watermarked images are decrypted by the image group watermark detection logic 204. Accordingly, embodiments of the image group watermarking system 10 may be configured to include the image group watermark detection logic 204 along with watermark encryption logic 110. For convenience, the image group watermark detection logic 204 is illustrated as residing in memory element 202 or personal computer 202. The image group watermark detection logic 204 could also be included in digital camera 100. Other embodiments of the image group watermarking system 10 do not include the image group watermark detection logic 204, and are therefore not configured for decrypting watermarked images. Furthermore, other embodiments of the image group watermarking system 10 only include the image group watermark detection logic 204 (without the watermark encryption logic 110), and are therefore limited to decrypting watermarked images. The particular embodiment of an image group watermarking system 10 implemented in a processing device such as, but not limited to, personal computer 200, or implemented in digital camera 100, is based upon the particular purpose and functionality of the device itself. Thus, omitting the image group watermark detection logic 204 conserves memory resources. Similarly, omitting the watermark encryption logic 110 in a packaged program configured for a personal computer 202 may be desirable under certain product marketing strategies.

Figure 5A:
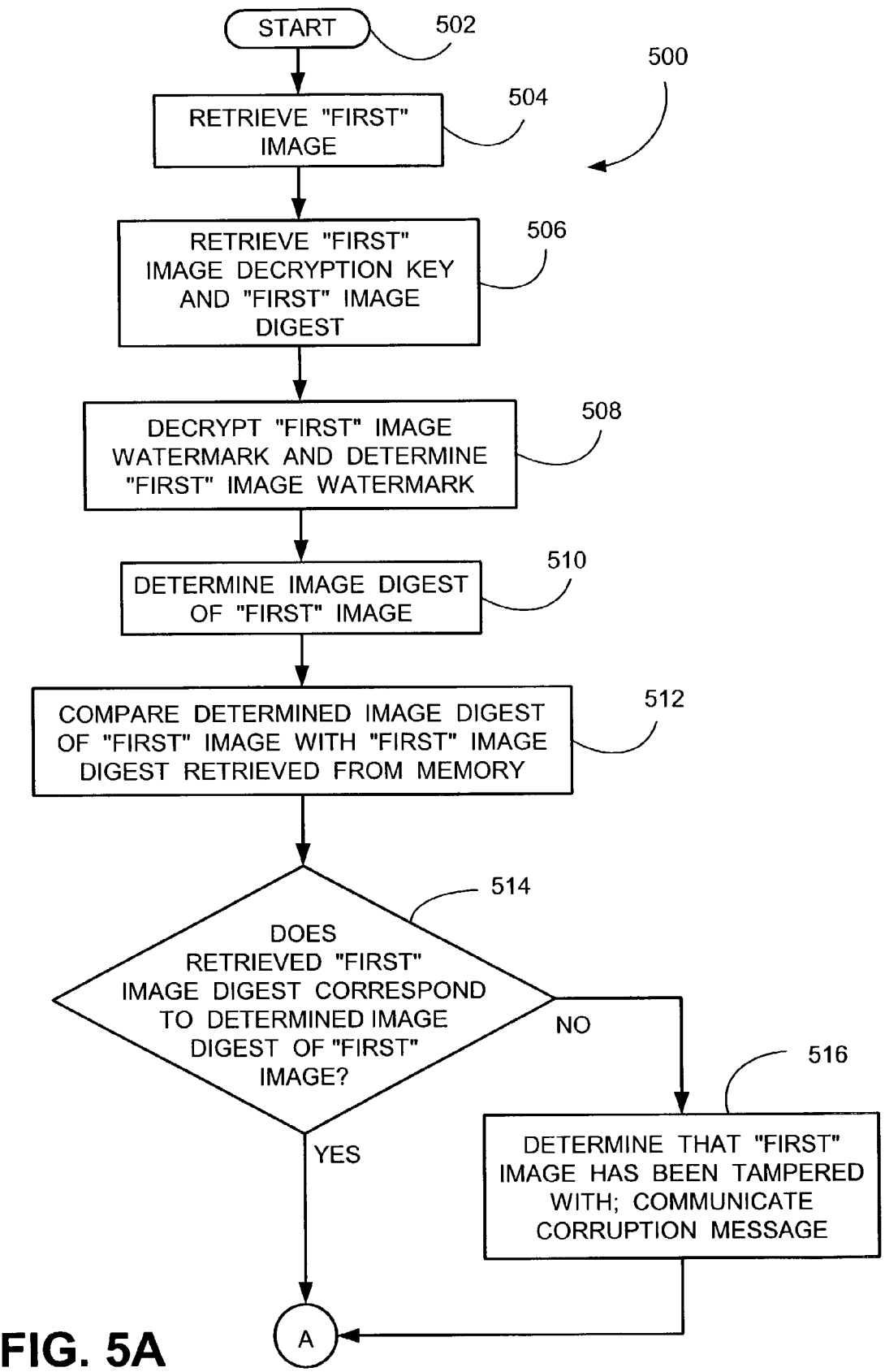
FIGS. 5A–C is a flowchart illustrating a process used by an embodiment of the image group watermarking system.
Figure 5B:
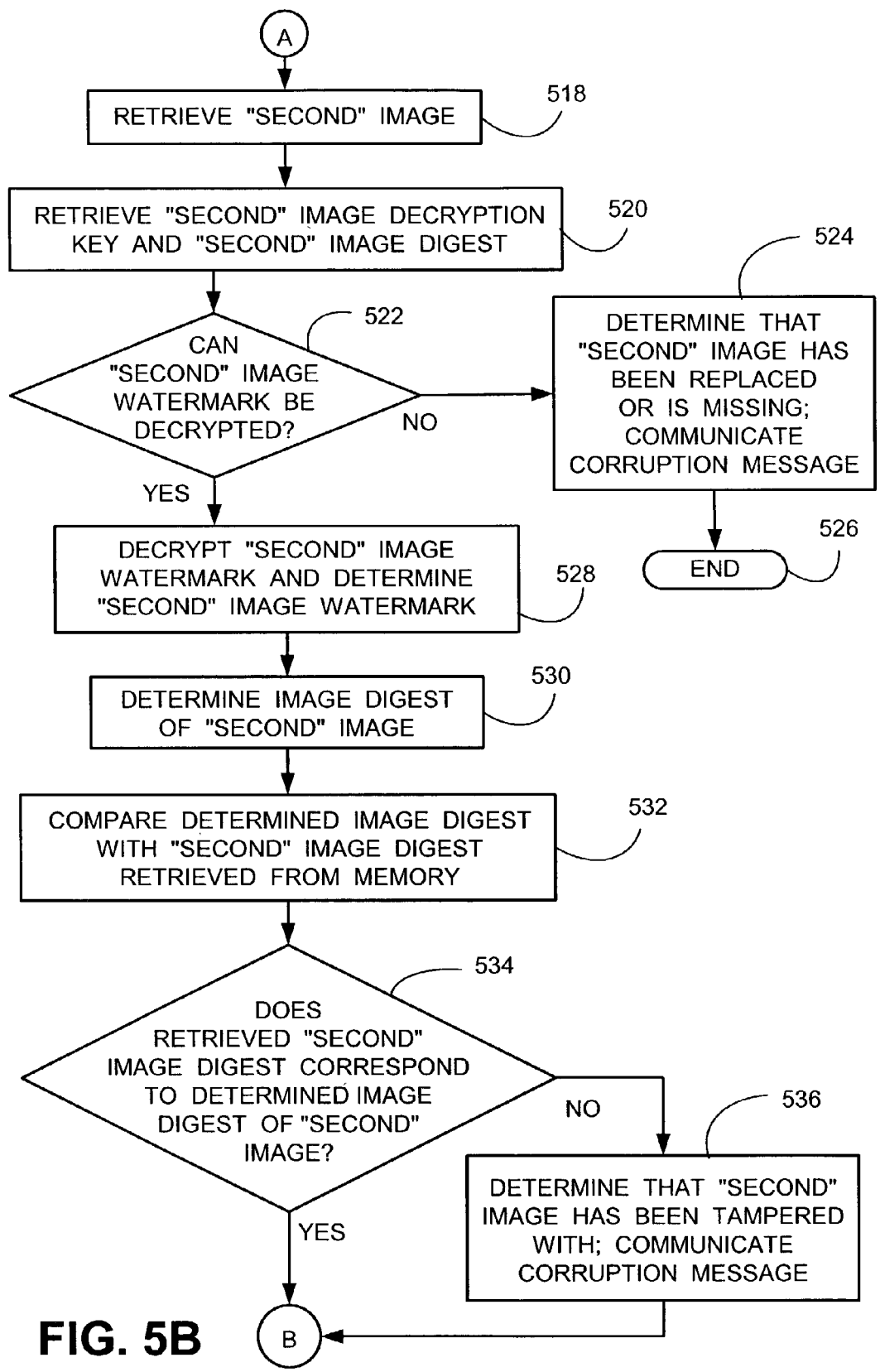
Figure 5C:
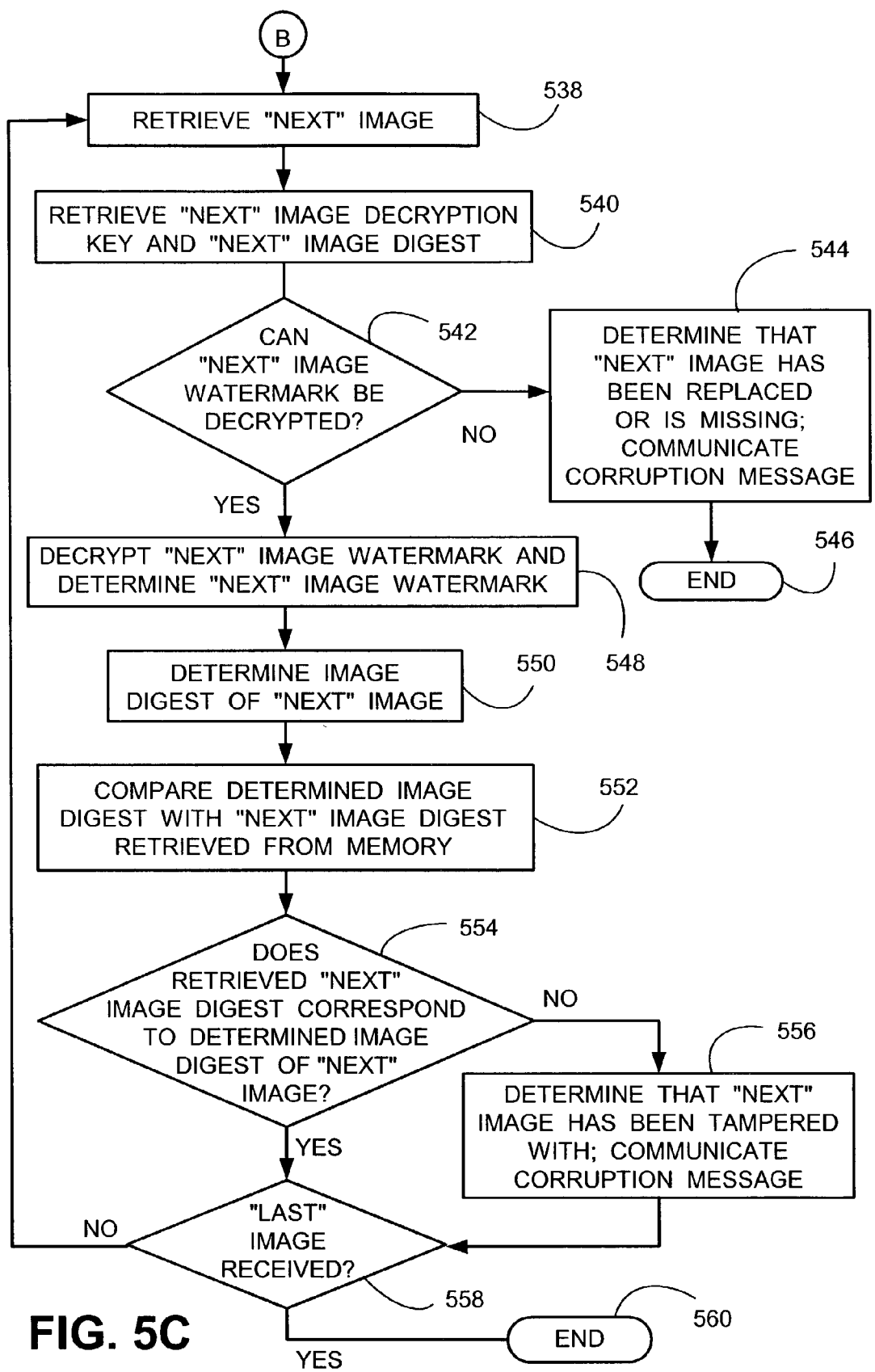

FIGS. 5A–C is a flowchart 500 illustrating a process used by an embodiment of the image group watermarking system 10. Flowchart 500 shows the architecture, functionality, and operation of one implementation of a system for decrypting a plurality of watermarked images in a watermarked image group in accordance with the present invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5A–C. For example, two blocks shown in succession in FIGS. 5A-C may in fact be executed substantially concurrently or the blocks may sometimes be executed in the reverse order, depending upon the functionality involved, as will be further clarified hereinbelow.

It is understood that prior to starting the process illustrated by flowchart 500, a plurality of watermarked images in a watermarked image group reside in a memory and are accessible by the processing device that is executing the image group watermark detection logic 204. Accordingly, with an embodiment of the image group watermarking system 10 implemented in digital camera 100 having the image group watermark detection logic 204, a plurality of images have been captured by the digital camera 100, have been defined as an image group, watermarked in accordance with the present invention, and stored in memory a watermarked image group. Similarly, with an embodiment of the image group watermarking system 10 having the image group watermark detection logic 204 implemented in personal computer 200, a watermarked image group can be accessed from a memory.

Furthermore, the "first" image decryption key is also accessible from a memory so that the "first" watermark of the watermarked image group can be decrypted. Thus, if the image group watermark detection logic 204 is executed by processor 210 residing in personal computer 100, the "first" image decryption key has been communicated to the personal computer 200 and stored in the key region 208 of memory 202 (or in another suitable location or memory unit). In another embodiment, the "first" image decryption key would be accessed from the first image encryption key 112 region of memory 104, or from the first image encryption key region 220 or memory module unit 224, when the digital camera 100, or the memory module unit 224, respectively, is coupled to personal computer 200.

Alternatively, the "first" decryption key may be securely retained in the first image encryption key 112 region of memory 104, or securely retained in the first image encryption key region 220 or memory module unit 224. Thus, decryption of watermark in the watermarked images would require that the digital camera 100 or the memory module unit 224 be coupled to personal computer 200, thereby improving overall security of the watermarked image group.

Also, the image digests of the watermarked images are accessible from a memory so that when the watermark is retrieved from the watermarked images and decrypted to determine an image digest, the determined image digest can be compared to the retrieved image digest. Differences between the determined and retrieved image digests for an image would indicate that the image has been removed, replaced, forged, tampered with, altered, or otherwise corrupted. If the determined image digest is the same as the retrieved image digest, then the image has not been removed, replaced, forged, tampered with, altered, or otherwise corrupted.

The process of decrypting the watermark from watermarked images in a watermarked image group starts at block 502. At block 504, the "first" watermarked image is retrieved from memory. At block 506, the "first" image decryption key and the "first" image digest is retrieved from memory. At block 508, the "first" image is processed such that the "first" image watermark is determined. At block 510, the image digest associated with the "first" image is determined from the "first" image watermark.

At block 512, the determined image digest associated with the "first" image is compared with the retrieved "first" image digest. At block 514, a determination is made whether the retrieved "first" image digest corresponds to the determined image digest. If the retrieved "first" image digest corresponds to the determined image digest for the "first" image (the YES condition), the process proceeds to block 518. If not (the NO condition), the process proceeds to block 516 such that a determination is made that the "first" image has been tampered with.

A corruption message is generated and communicated at block 516 in response to determining that the "first" image has been tampered with. The specific corruption message generated and communicated may be done in a variety of manners so long as a individual viewing the first image understands that image corruption has occurred. For example, a textual message may be generated and communicated to the viewer. Another embodiment may generate and communicate a suitable animation or a suitable graphic image that indicates image corruption. Another embodiment may be configured to determine the type, nature and/or extent of image corruption and communicate such information to the viewer. It is understood that the various forms of the corruption message is nearly limitless so long as a viewer is informed that image corruption has been detected by the image group watermarking system 10.

In one embodiment, the process then proceeds to block 518 where the "second" watermarked image is retrieved from memory. At block 520, the "second" image decryption key and the "second" image digest is retrieved from memory.

At block 522, a determination is made whether the "second" image watermark can be decrypted. That is, was a "second" image decryption key successfully retrieved from the decryption of the "first" image watermark. If the "second" watermark of the second image can be decrypted (the YES condition), the process proceeds to block 528. If the "second" watermark cannot be decrypted, the process proceeds to block 524 such that a determination is made that the "second" image has been replaced or is missing. Also, a suitable corruption message is generated. The specific corruption message generated and communicated may be done in a variety of manners so long as a individual viewing the image understands that image corruption has occurred. The process then ends at block 526 (since the "next" decryption key required for decryption of the "next" image watermark, as described below, can not be determined).

At block 528, the "second" image is processed such that the "second" image watermark is determined. At block 530, the image digest associated with the "second" image is determined from the "second" image watermark.

At block 532, the determined image digest associated with the "second" image is compared with the retrieved "second" image digest. At block 534, a determination is made whether the retrieved "second" image digest corresponds to the determined image digest. If the retrieved "second" image digest corresponds to the determined image digest for the "second" image (the YES condition), the process proceeds to block 538. If not (the NO condition), the process proceeds to block 536 such that a determination is made that the "second" image has been tampered with. A corruption message is generated and communicated at block 536 in response to determining that the "second" image has been tampered with. The specific corruption message generated and communicated may be done in a variety of manners so long as a individual viewing the image understands that image corruption has occurred.

The process then proceeds to block 538 where the "next" watermarked image is retrieved from memory. At block 540, the "next" image decryption key and the "next" image digest is retrieved from memory.

At block 542, a determination is made whether the "next" image watermark can be decrypted. That is, was a "next" image decryption key successfully retrieved from the decryption of the "second" image. If the "next" image watermark can be decrypted (the YES condition), the process proceeds to block 548. If the "next" image can not be decrypted, the process proceeds to block 544 such that a determination is made that the "next" image has been replaced or is missing. Also, a suitable corruption message is generated. The specific corruption message generated and communicated may be done in a variety of manners so long as a individual viewing the first image understands that image corruption has occurred. The process then ends at block 546 (since the "next" decryption key required for decryption of the "next" image, as described below, can not be determined).

At block 548, the "next" image is processed such that the "next" image watermark is determined. At block 550, the image digest associated with the "next" image is determined from the "next" image watermark.

At block 552, the determined image digest associated with the decrypted watermark from the "next" image is compared with the retrieved "next" image digest. At block 554, a determination is made whether the retrieved "next" image digest corresponds to the determined image digest. If the retrieved "next" image digest corresponds to the determined image digest for the "next" image (the YES condition), the process proceeds to block 558. If not (the NO condition), the process proceeds to block 556 such that a determination is made that the "next" image has been tampered with. A corruption message is generated and communicated at block 556 in response to determining that the "next" image has been tampered with. The specific corruption message generated and communicated may be done in a variety of manners so long as a individual viewing the first image understands that image corruption has occurred.

At block 558, a determination is made whether the "last" image watermark of the predefined image group has been decrypted. If not (the NO condition), the process returns to block 538 such that the "next" image is received and then processed. That is, blocks 538 through 558 are repeated until all but the "last" image watermark has been decrypted and processed (assuming no image tampering).

If the last image watermark has been decrypted and processed successfully (the YES condition), the process ends at block 560. That is, the current image being processed (the current "next" image) is, in fact, the last watermarked image in the watermarked image group.

The above-described process presumes that the "first" image decryption key was provided such that the process of decrypting watermarks from watermarked images began with the "first" watermarked image. Thus, the watermarked image group processed above could be generated by an embodiment of the watermark encryption logic 110 that inserts the "first" image decryption key into the "last" image watermark, or by an embodiment of the watermark encryption logic 110 that does not insert the "first" image decryption key into the "last" watermarked image.

An alternative embodiment of the image group watermark detection logic 204 is configured to allow the watermark decryption process to start with any one of the watermarked images. For example, one embodiment described above saved the "second" image decryption key. This "second" image decryption key would be communicated together or separately to the individual verifying the integrity of the watermarked image group. Thus, the first image watermark decrypted would be the "second" watermarked image. The other watermarks would be, in-turn, decrypted until all watermarks are decrypted in accordance with the present invention.

The image group watermark detection logic 204 and/or the watermark encryption logic 110 of the various above-described embodiments of the image group watermarking system 10 can be implemented in software (e.g., firmware), hardware, or a combination thereof residing in memory elements 104 and/or 202. When the image group watermark detection logic 204 and/or the watermark encryption logic 110 is implemented in software, the logic may be an executable program that is executed by a special and/or a general purpose computer, such as, but not limited to, a personal computer 200 (PC; IBM-compatible, Apple-compatible, or otherwise), workstation, minicomputer, and a mainframe computer. The camera processor 114 and/or processor 210 is a hardware device for executing software, particularly that stored in memory elements 104 and/or 202. The camera processor 114 and/or processor 210 can be any custom made or commercially available camera processor and/or personal computer processor, a central processing unit (CPU), an auxiliary processor among several processors associated with the personal computer 200 and/or digital camera 100, a semiconductor based microprocessor (in the form of a microchip or chip set), a microprocessor, or generally any device for executing software instructions. Examples of suitable commercially available microprocessors include: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory elements 104 and/or 202 can include any one or combination of volatile memory elements (e.g., random access memory (RAM, such as DRAM, SRAM, SDRAM, etc.) and nonvolatile memory elements (e.g., ROM, hard drive, tape, CDROM, etc.). Moreover, memory elements 104 and/or 202 may incorporate electronic, magnetic, optical, and/or other types of storage media. Note that the memory elements 104 and/or 202 can have a distributed architecture, where various components are situated remote from one another, but can be accessed by the camera processor 114 and/or the processor 210.

Embodiments of the image group watermark detection logic 204 and/or the watermark encryption logic 110 may be a source program, executable program (object code), script, or any other entity comprising a set of instructions to be performed. When a source program, then the program needs to be translated via a compiler, assembler, interpreter, or the like, which may or may not be included within the memory element 104 and/or 202, so as to operate properly in connection with an operating system. Furthermore, the image group watermark detection logic 204 and/or the watermark encryption logic 110 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the image group watermark detection logic 204 and/or the watermark encryption logic 110 is implemented in software, as is shown in FIG. 2, it should be noted that the image group watermark detection logic 204 and/or the watermark encryption logic 110 can be stored on any computer readable medium for use by or in connection with any computer related system or method.

In the context of this document, a computer readable medium is an electronic, magnetic, optical, or other physical device or means that can contain or store a computer program for use by or in connection with a computer related system or method. The image group watermark detection logic 204 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic, flash), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM CD, DVD, etc.) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the image group watermark detection logic 204 and/or the watermark encryption logic 110 is implemented in hardware, the logic can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method protecting the integrity of a group of images, the method comprising the steps of:
   watermarking each one of a plurality of images in an image group with a unique watermark having at least an image digest, the image digest comprising information that identifies the watermarked image as an original image, and the plurality of images having a predefined order in the image group, each image being stored in a complete and separate data file; and
   including in selected ones of the unique watermarks a unique decryption key, each one of the unique decryption keys configured for decrypting the unique watermark of a next image in the image group, wherein each decryption key is stored separately from the image digest and is not dependent upon the image digest.

2. The method of claim 1, wherein the step of including in selected ones of the unique watermarks the unique decryption key further comprises the step of watermarking all of the plurality of images in the image group with the unique watermark having the unique decryption key of the next image in the image group, and wherein a first image in the image group is defined as the next image for a last image of the image group.

3. The method of claim 1, wherein the step of watermarking selected ones of the plurality of images with the unique watermark having the unique decryption key further comprises the step of watermarking all but the last image of the plurality of images with the unique watermark having the unique decryption key of the next image in the image group.

4. The method of claim 1, further comprising the step of saving into a memory each one of the image digests associated with the plurality of images in the image group.

5. The method of claim 1, further comprising the step of saving a selected decryption key, the selected decryption key being selected from the plurality of unique decryption keys.

6. The method of claim 1, further comprising the step of retrieving the image group from a memory.

7. The method of claim 6, further comprising the step of defining the order of the plurality of images in the image group such that the plurality of images are sequentially ordered.

8. The method of claim 7, further comprising the step of actuating a controller residing on an image capture device such that a captured image is defined as a member of the image group.

9. The method of claim 1, further comprising the steps of:
   capturing a plurality of images wit an image capture device; and
   actuating a controller residing an the image capture device such tat at least one next captured image is defined as a member of the image group.

10. The method of claim 1, further comprising the steps of:
    defining at least one encryption key; and
    encrypting the unique watermark having the image digest and the unique decryption key for the next image using the defined encryption key.

11. The method of claim 10, further comprising the step of destroying the encryption key after the step of encrypting is complete.

12. A method determining the integrity of a group of images, the method comprising the steps of:
    retrieving a plurality of watermarked images, the plurality of watermarked images residing in a watermarked image group and having a predefined order in the watermarked image group, each watermarked image being stored in a complete and separate data file;
    retrieving a first decryption key, the first decryption key corresponding to a selected one of the plurality of watermarked images;
    decrypting a unique watermark from the selected watermarked image using the retrieved first decryption key such that a first image digest is determined and a next image decryption key is determined;

retrieving an original first image digest associated with the selected watermarked image;

comparing the original first image digest with the determined first image digest to determine the integrity of the selected watermarked image;

decrypting a next unique watermark from a next watermarked image with the next image decryption key, the next watermarked image being the following image in the plurality of ordered watermarked images;

retrieving an original next image digest associated with the next watermarked image;

comparing the original next image digest with the determined next image digest to determine the integrity of the next watermarked image; and repeating the steps of decrypting the next unique watermark from the next watermarked image, retrieving the original next image digest and comparing the original next image digest for the remaining plurality of watermarked images, wherein each decryption key is stored separately from the image digest and is not dependent upon the image digest.

13. The method of claim 12, further comprising the step of retrieving a first image from the ordered plurality of watermarked images such that the retrieved first image is associated with the retrieved first decryption key and the original first image digest.

14. The method of claim 12, further comprising the step of decrypting the unique watermark from a first image from the ordered plurality of watermarked images using the next decryption key decrypted from the unique watermark of a last image in the ordered plurality of watermarked images.

15. The method of claim 12, wherein a first watermarked image of the plurality of ordered watermarked images in the watermarked image group is defined as the next image for a last watermarked image of the watermarked image group.

16. The method of claim 12, further comprising the step of generating an image corrupted message when the step of comparing the original first image digest with the determined first image digest determines that the original first image digest is different from the determined first image digest.

17. The method of claim 12, further comprising the step of generating an image corrupted message when the step of comparing the original next image digest with the determined next image digest determines that the original next image digest is different from the determined next image digest.

18. The method of claim 12, further comprising the step of stopping the steps of decrypting the unique watermark from the next watermarked image, retrieving the original next image digest and comparing the original next image digest when a current watermarked image cannot be decrypted to retrieve the next image decryption key.

19. A system which protects the integrity of a group of images using an image capture device, comprising:

a photosensor configured to capture an image;

a memory configured to store a plurality of captured images, each captured image stored as a separate and complete data file;

an actuator configured to define selected ones of the captured images as a member of an image group; and a processor configured to watermark each one of the selected captured images with a unique watermark having at least an image digest that identifies the selected captured image, and the unique watermark further having a unique decryption key that is configured to decrypt the unique watermark of next one of the selected captured images, wherein each decryption key is stored separately from the image digest and is not dependent upon the image digest.

20. The system of claim 19, wherein the processor is further configured to save the image digest for each one of the watermarked selected captured images into the memory, and is further configured to save one of the decryption keys.

21. The system of claim 19, wherein the image capture device comprises at least one selected from a group consisting of a digital camera, a facsimile machine and a copy machine.

22. A system which protects the integrity of an image group having a plurality of images in a predefined order in the image group, comprising:

means for watermarking each one of a plurality of images in an image group with a unique watermark having at least an image digest, the image digest comprising information that identifies the watermarked image as an original image, each image being stored in a complete and separate data file; and means for including in selected ones of the unique watermarks a unique decryption key, each one of the unique decryption keys configured for decrypting the unique watermark of a next image in the image group, wherein each decryption key is stored separately from the image digest and is not dependent upon the image digest.

* * * * *

UNITED STATES PATENT AND TRADEMARK OFFICE
CERTIFICATE OF CORRECTION

| | | |
|---|---|---|
| PATENT NO. | : 7,120,273 B2 | Page 1 of 1 |
| APPLICATION NO. | : 10/159467 | |
| DATED | : October 10, 2006 | |
| INVENTOR(S) | : Mark Nelson Robins et al. | |

It is certified that error appears in the above-identified patent and that said Letters Patent is hereby corrected as shown below:

On the title page, item (73), in "Assignee", in column 1, line 2, delete "LP." and insert -- L.P. --, therefor.

In column 18, line 42, in Claim 9, delete "wit" and insert -- with --, therefor.

In column 18, line 44, in Claim 9, delete "an" and insert -- on --, therefor.

In column 18, line 45, in Claim 9, delete "tat" and insert -- that --, therefor.

Signed and Sealed this

Nineteenth Day of May, 2009

JOHN DOLL
*Acting Director of the United States Patent and Trademark Office*